Aug. 5, 1969    R. A. LISTON    3,459,454
ELLIPTICAL WHEEL
Filed Aug. 7, 1967    2 Sheets-Sheet 1

RONALD A. LISTON
INVENTOR.

BY H. M. Saragovitz
E. J. Kelly, H. Berl
and R. M. Lyon
ATTORNEYS

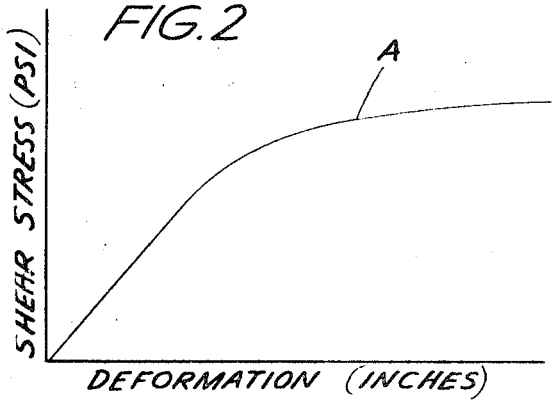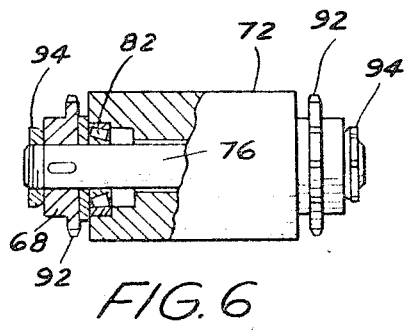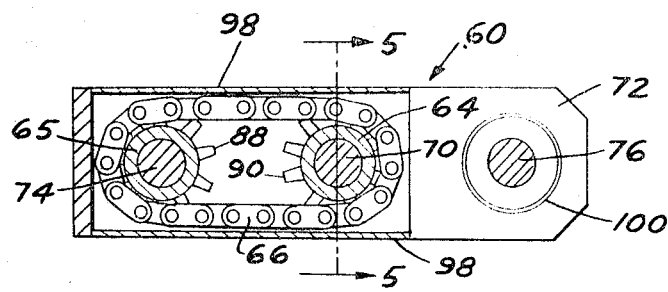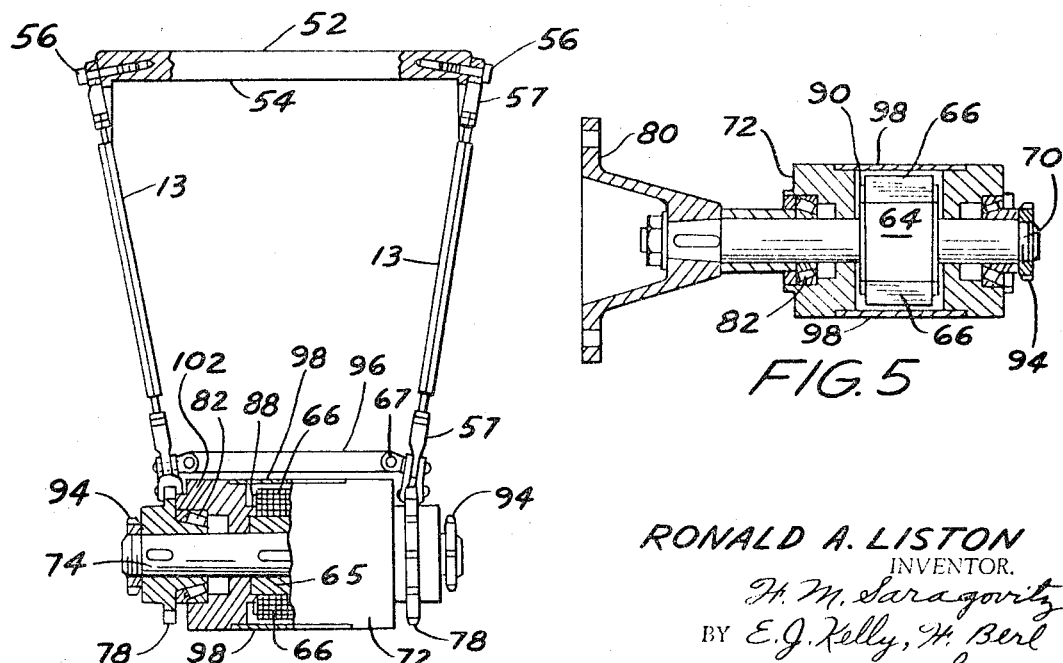

3,459,454
ELLIPTICAL WHEEL
Ronald A. Liston, Hancock, Mich., assignor to the United States of America as represented by the Secretary of the Army
Filed Aug. 7, 1967, Ser. No. 658,958
Int. Cl. B60b 1/02, 27/04
U.S. Cl. 301—5         12 Claims

ABSTRACT OF THE DISCLOSURE

An elliptically-shaped wheel having a flexible rim, an ellipse generating hub, and a plurality of non-rigid spokes connecting the rim and the hub so that the outer rim of the hub maintains an elliptical shape, thereby improving the traction capabilities of the wheel. The spokes are all non-radial with respect to the rotational axis of wheel with the exception of two spokes which are the maximum number of spokes that may be radially oriented at any given point of rotation.

---

This invention described herein may be manufactured and used by or for the Government without the payment to me of any royalty thereon or therefor.

This invention relates to a novel wheel construction and more particularly to an elliptical vehicle wheel which provides increased traction over a conventional wheel of the same vertical height while incorporating functions in the wheel normally accomplished by means of suspension elements. Prior art mechanisms utilized to increase traction and wheel contact area have included wheels with flexible rims, large tires, anti-skid devices, flexible spokes and tilting hubs which produce long, narrow ground contact areas. When attempting to improve performance by increased traction, it is necessary to cause either more soil failure or cause the soil to fail in such a way as to increase the resistance to failure. The former is achieved by an increase in wheel contact area and the latter by means of proper grouser design. Attempts to produce a significant performance improvement through the use of grousers, have generally proved unacceptable for operation on hard ground. Specific prior art development have included: grousers which extend beyond the outer periphery of the tire; the hubless wheel having a flexible rim which serves as both the suspension and drive mechanism; several wheel forms developed for lunar vehicle applications which incorporate flexible rims and flexible spokes; various anti-skid devices using liquids or air as a lubricant; and concentric dual tires.

The primary disadvantage of all of these prior art systems or solutions lies in their mechanical complexity. Although this is not necessarily true of the hubless wheel which is mechanically very simple, this system provided no real solution because it cannot be operated in soft soil due to clogging of the drive. The concentric dual tire does not have the major disadvantages which are overcome by the present invention, however, it is more easily damaged than is the vehicle wheel of the present invention.

A coventional solution to the problem of increased traction would for example, attempt to increase soft soil performance by increasing the dimensions of the wheel and thereby decrease the ground pressure. Conventional methods have accomplished this by either increase of the width of the track or making the wheel of a larger diameter. Both of these solutions are undesirable for reasons which will follow. As is well known, motion resistance is proportional to contact area and width. A given area increase will produce a fixed increase in traction independent of whether the increase is produced by greater width or diameter. However, motion resistance is proportional to width, therefore, more force is required to move a vehicle mounted on wide wheels than one mounted on narrow wheels even though both sets of wheels have the same surface contact area. Hence, increasing the width of the wheels is undesirable.

Another factor to be considered in wheel design is wheel slip. In order for a wheel to develop traction, it is necessary that soil be deformed. The soil will shear when it is deformed and then the wheel will slip. For a given contact area, the percent of slip relative to the contact length will be much less for a narrow wheel than it will be for a wider wheel. The decreased slip will greatly increase vehicle efficiency. The present invention provides the desirable effect of a wheel of large diameter without incorporating the disadvantages of same.

According to the present invention, there is provided an elliptical vehicle wheel having increased traction over a conventional wheel of the same vertical height and incorporating the functions of a suspension system. More particularly, there is provided an elliptical vehicle wheel comprising a flexible rim, spoke connectors mounted upon the inner periphery of the flexible rim, flexible spokes joined to the spoke connectors at one extremity and a drive chain at the other extremity, said spokes being adjusted so that they receive only tensile load unless the elliptical wheel strikes an obstacle severely enough to cause buckling of the flexible rim. The drive chain forms a portion of an ellipse generating hub which further comprises a chain drive sprocket, driven by a drive gear connected to said drive sprocket by means of a chain or timing belt, an idler sprocket which maintains the elliptical shape of the wheel and vehicle axle and drive train to which the drive gear is connected.

It is therefore an object of the present invention to provide a wheel having an increased traction over a conventional wheel of the same vertical height and incorporating functions in the wheel which are normally accomplished by suspension elements.

Another object of the present invention is the provision of a vehicle wheel which supplies increased traction over conventional wheels while providing a high degree of mechanical simplicity.

Still another object of the present invention is the provision of a vehicle wheel which combines increased traction with a high resistance to obstacle caused damage.

It is yet another object of the present invention to increase wheel contact area so that the longer dimension of the area is oriented in the direction of wheel motion.

A further object of the present invention is to provide a wheel form which will produce an increase in soft soil performance by increasing traction and decreasing motion resistance.

Other objects and advantages of the present invention will be made obvious to those skilled in the art by the following description when considered in relation to the accompanying drawing of which:

FIG. 2 is a typical soil shear stress-strain curve;

FIG. 3 is an elevational view broken away in part of a portion of the hub according to the present invention;

FIG. 4 is a view of the chain drive sprocket according to the invention shown partially in section along lines 4—4 of FIG. 1;

FIG. 5 is a cross-sectional view of the drive gear portion of the ellipse generating hub of the elliptical wheel of the present invention along the line 5—5 of FIG. 3; and FIG. 6 is an elevational end view shown partially in section, of the hub and the idler sprocket of the ellipse generating hub of the elliptical vehicle wheel according to the present invention.

Figure 1:
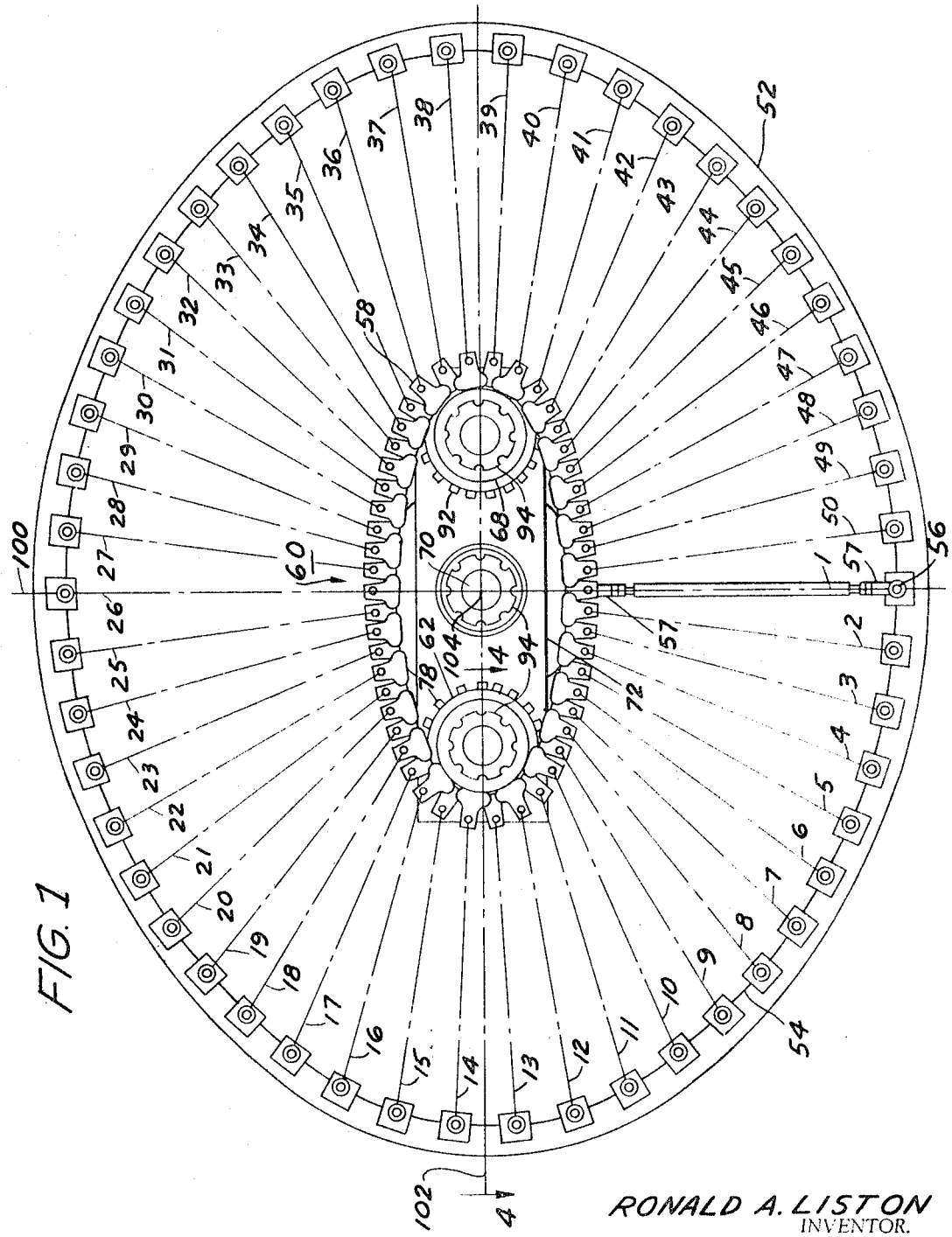
FIG. 1 is an elevational view of the high traction, elliptical vehicle wheel of the present invention.

Referring now to the drawing wherein like numerals refer to corresponding parts in the various figures, FIG. 2 illustrates the relationship between shear strength and deformation. As mentioned previously, soil must be deformed to obtain traction. The maximum shear strength occurs after significant deformation has occurred. This may be one of several inches and is indicated generally as point A in the drawing. If the contact area of the wheel is oriented so that the longer dimension is in the direction in which the soil is sheared, the wheel is more efficient than if the shorter dimension were oriented in the direction of shear. That is, shear of the soil can only be achieved by means of wheel slip. If the wheel must slip one inch and the length of the contact area is two inches, the wheel must develop 50% slip to achieve maximum traction. If instead, the contact length is four inches, the same traction can be developed at 25% slip.

As shown in FIGS. 1 and 4, the wheel is provided with surface engaging material 52 which may consist of a rubber tire or other suitable flexible material bonded to flexible rim 54. The rim 54 may consist of any material such as spring steel which will readily regain its original shape after being partially deformed. Moreover, the rim 54 should have a low resistance to deflection and should be preferably composed of some type of metal. Centrally located within rim 54 is the ellipse generating hub denoted generally at 60. The flaccid spokes 1–50, hereinafter described, comprise the connecting means between outer rim 54 and hub 60.

For each spoke 1–50 that is shown, there is a corresponding spoke on the opposite side of the wheel as can be seen in FIG. 4. The foundation of hub 60 is frame 102 around and within which the various hub components are fixed. Centrally located within hub 60 is a drive gear 64 shown in FIGS. 3 and 5. Drive gear 64 is fixed to shaft 70 in any suitable manner such as a key and has gear teeth 90 cut about the outer circumference. Shaft 70 is shown as being journalled within taper bearings 82 which are suitably mounted in frame 72. The rotational axis of the wheel is shown at 104 passing through the centerline of shaft 70 and about which shaft 70 rotates. As can be seen in FIG. 5, sheave 80 is fixed to shaft 70 by means of a press-fit or other suitable mounting. Sheave 80 is secured to the vehicle power drive means and serves to couple the power from the vehicle to the wheel. Bolts or other similar devices may be used to secure sheave 80 to the power drive means. A fastening nut 94 is secured to either end of shaft 70. The minor axis 100 and the major axis 102 of the ellipse are shown as intersecting at the rotational axis 104 about which the wheel rotates. As can be seen in FIGS. 3 and 5, drive chain 66 encircles drive gear 64 and driven gear 65.

Driven gear 65 is shown as being mounted on shaft 74 and has teeth 88 formed therein as shown in FIGS. 3 and 4. Shaft 34 is journalled in taper bearings 82 which are fixed within frame 72. A drive sprocket 62 is mounted on each end of shaft 74 by any suitable means such as fastening nut 94. A cover plate 98 is mounted flush with the surface of frame 72 and serve as a safety device in keeping chain 66 covered and also to keep chain 66 free of dirt. In place of chain 66, an idler gear could be substituted which would be located intermediate and in driving relation with drive and driven gears 64 and 65. Drive sprockets 62, which are located on either side of gear 65, have teeth 78 formed therein as shown in FIGS. 1 and 4. Teeth 78 engage drive chain 58 which is shown in FIG. 1 as encircling both drive sprockets 62 and idler sprockets 68 on either side of hub 60. Gear teeth 92 are formed in idler sprockets 68 for engaging drive chain 58. Idler sprockets 68 are shown in FIG. 6 as being mounted on either end of shaft 76 by any suitable means such as fastening nut 94. As can be seen in FIG. 1, drive gear 64, drive sprocket 62, and idler sprocket 68 are all fixed in frame 72 in fixed spaced relation along the major axis 104. Shaft 76 is journalled in taper bearings 82 which are fixed in boss 84 of frame 72. Idler sprocket 68 could also be provided with adjustment means to vary the tension on drive 58. Chain 58 could be replaced by a large idler gear or sprocket which would mesh with sprockets 62 and 68.

By having idler sprocket 68 displaced from drive sprocket 62 in the manner shown, the drive chain 58 is forced to take an elliptical shape. Rotatably mounted on chain 58 and about the inner periphery of rim 54 are spherical bearing rod end connectors 58 which are commercially available. Eye bolts 67 serve as securing means about which connectors 57 may rotate relative to drive chain 58. Connector pins 56 are secured to tire 52 and connectors 57 may rotate thereon. Non-rigid spokes 1–50 are secured at either end to connectors 57. Although firm, solid, resilient, hydraulically operated or flexible spokes could be also used, the flabby spoke according to the invention represents a marked improvement. For example, in the event tire 52 and rim 54 are deformed radially inward, flaccid spokes 1–50 will not be damaged but will merely become limp. If solid spokes were used, the likelihood of damage would greatly increase. It is important to note that at any given time, a maximum of two of the spokes 1–50 on either side of the wheel will be radially oriented with respect to centerline axis 104 about which drive shaft 70 rotates. The remaining 96 spokes will be non-radially oriented. This is an important feature because if the spokes 1–50 are radially oriented with respect to axis 104 and have pivot means at the hub and rim connection points, the feasibility of transmitting torque through the spokes has been eliminated. Because the spokes of the present invention are not radial, torque can be transmitted by the spokes by means of a tensile load much in the same manner that a bicycle wheel transmits torque.

Cross connector members 96 are shown in FIG. 4 as holding spokes 13 together. A cross connector serves to give the wheel lateral support. As the vehicle on which the wheel is mounted turns a corner, the outer rim tends to continue in the original direction and hence a gyroscopic movement is set into effect which tends to shift the inner hub 60 relative to the outer rim 54. Because of the flexibility of the rim and spokes, relative motion between the hub and rim is possible. By placing cross members 96 as shown, lateral stability is provided.

Another feature which can be incorporated into the hub assembly is a stop to prevent the hub from rotating when the rim rotates under normal conditions. When the wheel is operating on a relatively flat surface, the hub will not rotate. It is only when the work which is necessary to turn the wheel is less than the work necessary to lift the vehicle that the hub will rotate about axis 104. This could occur when the wheel encounters a large obstacle. Empirical tests have been made however, with obstacles which were as high as the vertical distance along minor axis 100 from the traversed surface to axis 104. These obstacles were traversed without hub 60 rotating. A stop or lock could also be provided to hold the wheel such that the major axis 102 extends vertically or at some angle thereto.

In operation, power is transmitted from the vehicle through sheave 80 to shaft 70 and gear 64. Chain 66 is driven by gear 64 which causes gear 65 to be driven. Shaft 74 having sprocket 62 mounted thereon is fastened to gear 65 and thereby caused to rotate. Sprocket 62 engages drive chain 58. The idler sprocket 68 has the function of maintaining the elliptical shape of the chain 68 and hence the entire wheel. Torque is transmitted from chain 58 to rim 54 by means of flexible spokes 1–50. When the wheel turns clockwise and is in the position shown in FIG. 1, only spokes designated 4–13 and 27–38 will transmit torque. On the other hand if the wheel is caused to rotate counter-clockwise and is in the position shown in FIG. 2, only spokes designated 14–25 and 39–56 will transmit power to the rim. Regardless of which spokes are transmitting torque however, only the spokes on the upper half of the wheel will support the hub 60. The axle load of the vehicle at any one time is carried by the spokes in the upper half of the wheel since the spokes can only accept a tensile load.

Assuming for instance the wheel to be turning counter-clockwise, and that an obstacle is encountered at the point where spokes 2–13 meet rim 54, the rim 54 will be deformed if the wheel hits the object with sufficient force. The hub 60 will tend to tilt so that sprocket 62 raises above major axis 102. Although spokes 2–13 will not be transmitting torque at this instant, the wheel will continue to rotate because spokes 27–38 are transmitting torque from the hub to the rim and hence the object will be negotiated. As soon as the obstacle is cleared, the rim 54 will resume its original elliptical shape.

Basically the weight of the vehicle on shaft 70 prevents hub 60 from rotating. As mentioned previously, if the force necessary to turn the wheel exceeds that necessary to raise the weight of the vehicle, the hub 60 will rotate. This may happen when the wheel hits a large obstacle at a sufficiently high speed. When this happens, the major axis 102 of the wheel can move around the axis 104 which means that the wheel will perform in a manner similar to a bogey suspension and thereby reduce the severity of the motion of the axle as the wheel negotiates a vertical obstacle. This results in a higher speed capability for the vehicle. Also, it should be noted that if the ellipse generating hub does rotate, it is designed to rotate about the vehicle axle 70 in such a manner that the wheel will travel a vertical distance equal to the distance between drive sprocket 62 and drive gear 64, thus approximating the action of the walking beam.

If a sufficiently large obstacle is encountered, the wheel will not be able to negotiate the obstacle. In such case either the tire 52 will spin or else hub 60 will spin about axis 104 and the tire 52 will remain stationary. This latter result will cause the major axis to be rotated about axis 104 while there is no linear motion of the vehicle. Thus the vehicle will stand in place and bounce up and down as the hub rotates. This will also simulate the bogey suspension mentioned above. If desired, this situation can be prevented through the use of stops which can be mounted on the hub alone or on the hub and the vehicle. Such stops would be located so as to permit limited rotation or tilting of hub 60 which normally occurs when small obstacles are encountered. The stops could be designed to be easily removable for flexibility in operation. While the wheel has been defined to include fifty spokes on each side of the wheel for a total of one hundred, it is to be understood that any number of spokes could be utilized which are sufficient to support hub 60 as the wheel rotates.

It is to be also understood that the drive chains could be replaced by similar drive means such as belts without departing from the spirit of the invention.

It is to be further understood that the wheel could be fabricated with non-flexible spokes, however, the added stability is accompanied by the disadvantage of permanent deformation if rigid spokes are used and slow reaction time if hydraulic spokes are utilized. It should also be noted that the connection of the spokes to the drive chain need not require a swivel connection but instead a fixed connection could be utilized.

The invention has been described in detail with particular reference to preferred embodiments thereof, but it will be understood that variations and modifications can be effected within the spirit and scope of the invention.

What I claim is:

1. An elliptically-shaped wheel having a major axis and a minor axis which intersect at the rotational axis about which said wheel rotates comprising,
an ellipse generating hub, a plurality of flaccid spokes, and an outer rim having a tire mounted thereon, said ellipse generating hub comprising
 a drive gear,
 a driven gear,
 a drive sprocket wheel,
 an idler sprocket wheel,
 first and second drive chains, and
 a frame,
 said driven gear and said idler sprocket wheel being mounted in said frame along said major axis in fixed spaced relation,
 said first drive chain being mounted within said frame and about said drive gear and said driven gear in driving relation,
 said drive sprocket wheel and said driven gear being fixedly mounted on a shaft so that said drive sprocket wheel rotates when said driven gear rotates,
 said second drive chain being mounted in driving relationship with said drive sprocket wheel and said idler sprocket wheel so that said second drive chain forms an elliptical shape,
 said spokes having a first end and a second end, said first end of said spokes being pivotably mounted to the inner periphery of said rim and said second end of said spokes being pivotally mounted to said second drive chain,
 said spokes being so oriented that a maximum of two spokes extend radially from said rotational axis at any given time.

2. An elliptical wheel comprising a flexible annular rim, a plurality of substantially inextensible flaccid spokes having a first and second end, said first end of said spokes being pivotally mounted about the inner periphery of said flexible rim, said second end of said spokes being pivotally attached to a centrally located ellipse generating hub, said rim being supported solely by said spokes, a maximum of two of said spokes extending radially from an axis about which said wheel rotates.

3. The elliptical wheel according to claim 2 further comprising a major axis and a minor axis, said major axis being parallel to the traversed surface while said flexible rim rotates about a rotational axis.

4. An elliptical wheel according to claim 3 wherein said hub is an ellipse generating hub comprising a drive means, a driven means, an idler sprocket wheel, first transfer means for transferring power from said drive means to said driven means to said idler sprocket wheel and said rim.

5. An elliptical wheel according to claim 4 wherein said drive means is a drive gear, said driven means comprises a drive sprocket wheel and said first and second transfer means comprise first and second drive chains respectively.

6. An elliptical wheel according to claim 5 wherein said spokes have a first end and a second end, said first end being rotatably fixed to the inner periphery of said rim and said second end rotatably fixed to said drive chain.

7. An elliptical wheel according to claim 6 wherein said driven means further comprises a driven gear connected to said drive sprocket wheel and said first drive chain such that rotation of said drive gear will cause said driven gear and said drive sprocket wheel to rotate thereby supplying power to said second drive chain and said rim.

8. An elliptical wheel according to claim 7 wherein said drive gear, said driven gear, said drive sprocket wheel and said idler sprocket wheel are mounted in a frame and thereby held in fixed spaced position relative to each other.

9. An elliptical wheel according to claim 2 wherein a tire is secured to said flexible rim.

10. An elliptical wheel comprising an annular flexible rim, a plurality of flaccid spokes having a first and second end, said first end of said spokes being rotatably mounted about the inner periphery of said flexible rim, said second end of said spokes being rotatably attached to a centrally located ellipse generating hub, comprising a drive gear, at least one sprocket wheel, means for transmitting the driving force of said drive gear to said drive sprocket wheel, a drive chain which is driven by said drive sprocket wheel, and an idler sprocket wheel which engages said drive chain, said idler sprocket wheel, drive gear and drive sprocket wheel aligned along the major axis of an ellipse whose major axis parallels the ground.

11. An elliptical wheel according to claim 10 further comprising a major axis and a minor axis, said major axis being maintained parallel to the traversed surface, and said idler sprocket wheel being aligned along said major axis in spaced relation.

12. An elliptical wheel as set forth in claim 11 wherein said means for transmitting the driving force of said drive gear to said drive sprocket wheel consists of a chain encircling said drive gear and a driven gear which is attached to said drive sprocket wheel by means of a shaft upon which both said drive sprocket wheel and said driven gear are mounted.

References Cited

UNITED STATES PATENTS

| | | | |
|---|---|---|---|
| 373,887 | 11/1887 | Fender | 305—19 |
| 1,810,854 | 6/1931 | Rimailho | 152—7 X |
| 2,055,932 | 9/1936 | Kitchen | 305—35 X |
| 2,376,802 | 3/1945 | Morse. | |
| 2,705,539 | 4/1955 | Martin | 152—7 X |
| 2,916,331 | 12/1959 | Gardner | 305—19 |

FOREIGN PATENTS 2,568   1861   Great Britain.

RICHARD J. JOHNSON, Primary Examiner

U.S. Cl. X.R.

301—55; 305—19